UNITED STATES PATENT OFFICE.

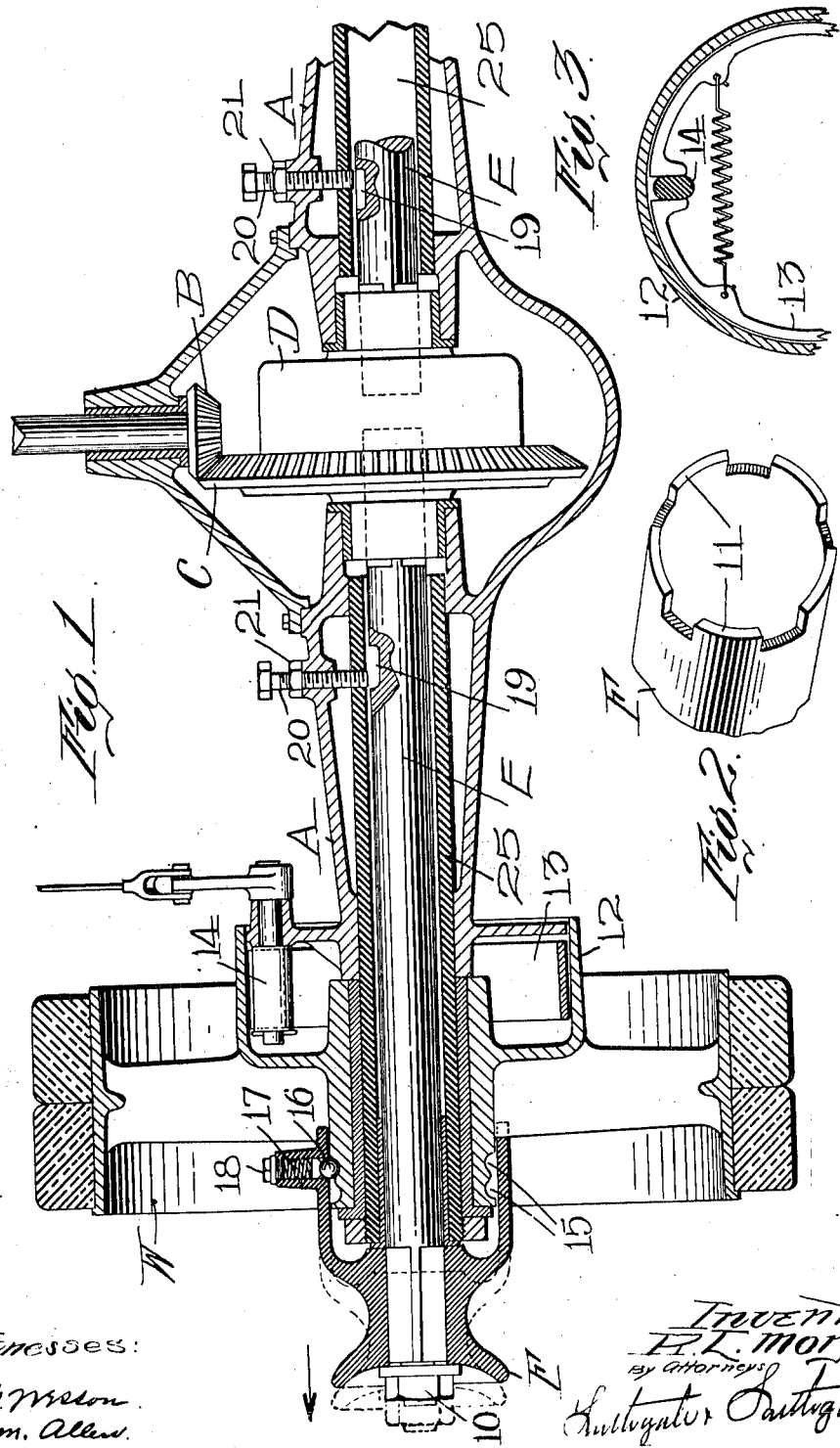

RALPH L. MORGAN, OF WORCESTER, MASSACHUSETTS.

CONSTRUCTION FOR TAKING POWER FROM AUTOMOBILES.

1,118,874.  Specification of Letters Patent.  Patented Nov. 24, 1914.

Application filed January 25, 1911.  Serial No. 604,543.

*To all whom it may concern:*

Be it known that I, RALPH L. MORGAN, a citizen of the United States, residing at Worcester, in the county of Worcester and State of Massachusetts, have invented a new and useful Construction for Taking Power from Automobiles, of which the following is a specification.

The object of this invention is to provide a new and improved means for taking power from an automobile.

It has been found desirable to provide means whereby power can be taken from automobiles, particularly trucks, for various purposes, such as operating a crane to load or unload the automobile; for pulling the truck out of holes; or for supplying power to other machines.

The particular object of the present invention is to provide a simple arrangement whereby this purpose may be accomplished and also to improve the rear axle construction of automobiles.

To this end the invention consists in taking power from the back or rear axle of the automobile, by providing the driving shaft or live axle which extends from and is driven by the differential, with means such as a capstan or pulley for taking power therefrom, and in making the clutch mechanism which connects said live axle to the driving wheel disengageable from said wheel without disengaging said shaft from the differential, so that by disengaging said driving shaft from the automobile wheel, said driving shaft may be driven and power taken therefrom while the automobile remains stationary.

The invention also consists of certain improved arrangements of parts hereinafter more particularly described. Enough of an improved back axle construction is shown in the accompanying drawing to illustrate the application of my invention.

Referring to said drawing and in detail, Figure 1 is a sectional plan view of a back axle construction with my improvements applied thereto. Fig. 2 is a partial end elevation of the disengageable clutch hereinafter described, and Fig. 3 is a partial end view of the brake mechanism.

Referring to the drawing and in detail, A designates part of a back axle casing. Journaled in this casing is a shaft which is driven from the motor, which shaft has a bevel pinion B on its end, which pinion meshes with and drives a bevel gear C which carries the usual differential D.

E—E designate the driving shafts or live axles, the inner ends of which are squared and fit into square holes in the differential. These parts are of any ordinary or approved construction.

W designates one of the automobile wheels which is journaled to revolve on the end of a tube 25 driven into the casing A. By journaling the wheels W on the ends of these tubes 25 a very strong construction is provided. Only one of the rear wheel constructions is shown, as this construction is duplicated in connection with the other rear wheel if it is desired to arrange the parts so that power can be taken from either or both sides of the automobile. The construction used in connection with the wheel illustrated will now be described.

The driving shaft or live axle E has its outer end squared and fitting on the same is a driving pulley or capstan F, which has a square hole to engage the square end of the driving shaft. This driving pulley or capstan F is held in place on the end of the driving shaft by a nut 10 threaded thereon. The driving pulley or capstan F is provided with an extending clutch 11, as shown more particularly in Fig. 2, said clutch being shaped to engage tightly with the spokes of the wheel so that when the parts are in the position shown in full lines in Fig. 1, said driving shaft or live axle will be connected to said wheel W. This construction is used with heavy automobile trucks where the wheels are made of steel castings. In lighter automobiles, the clutch is usually arranged to engage a clutch formed on the hub of the wheel, as well understood.

The automobile wheel W is provided with a brake rim 12, fitting in which is a brake 13 which is operated by a brake cam 14 connected to the usual brake lever. The hub of the wheel W is formed with two grooves 15—15 engaging which is a ball 16 normally pressed inward by a spring 17 seated in a hub formed in the pulley or capstan F, said spring being held in place by a screw 18 threaded into the end of said hub. By this arrangement, the driving shaft can be held in its inner or outer position.

The construction previously described can be applied to either or both driving shafts or live axles. If applied to both live axles, each live axle is preferably slabbed away as at 19 so that the same can be engaged by a screw 20 threaded into a hub formed in the casing A and fitted on which screw is a lock nut 21. The purpose of this arrangement is so that where the duplicate construction is used, and power taken only from one live axle, the inoperative live axle can be locked from rotation if desired.

The operation is as follows:—With the parts in the position shown in full lines in the drawings, the axles are connected to the automobile wheels so that the automobile can be driven as usual. When it is desired to take power from the automobile, the automobile is stopped and the brakes set. Then the capstan or pulley is pulled outwardly to the position shown in dotted lines Fig. 1. When in this outer position, the clutch 11 will be disengaged from the spokes of the wheel but the driving shaft will not be disengaged from the differential, whereby when the differential is driven from the automobile engine the capstan or pulley F will be rotated and no power will be applied to the automobile wheels. If the duplicate construction previously described is employed, and power taken from only one live axle, the other live axle is preferably blocked from rotating by means of one of the screws 20 and lock nuts 21, said screws being set inwardly to engage the slabbed portion of the driving shaft it is desired to render inoperative. It is not necessary to use this lock, as of course, the differential is inoperative to drive the automobile when one driving shaft or live axle is disengaged from its wheel. It is desirable to set the brakes while the operations described take place to prevent any creeping of the automobile. Additionally, if a great deal of power is to be transmitted or work is to be done, it is better to use the locking device on the live axle which is not to transmit power, which will cause the device to run more easily and with less vibration.

The details and arrangements herein shown and described may be greatly varied by a skilled mechanic without departing from the scope of my invention as expressed in the claims.

Having fully described my invention, what I desire to secure by Letters-Patent is:—

1. In a device for taking power from an automobile, the combination of a differential, a driving shaft or live axle extending therefrom and driven thereby, means for positively driving the differential, means for taking power from said shaft, means for connecting said shaft to one of the automobile wheels, and means for disengaging said wheel from the shaft without disconnecting said shaft from the differential.

2. In a device for taking power from an automobile, the combination of a differential, a driving shaft or live axle extending therefrom and driven thereby, a capstan or pulley arranged on the end of said shaft, and means for connecting said shaft to one of the automobile wheels, which can be disengaged without disconnecting said shaft from the differential.

3. In a device for taking power from an automobile, the combination of a differential, a driving shaft or live axle extending therefrom and driven thereby, and a capstan or pulley secured on the end of said shaft and having clutch teeth for engaging the automobile wheel, the parts being arranged so that said shaft can be pulled outwardly to disengage said clutch from the wheel without disengaging the said shaft from the differential.

4. In a device for taking power from an automobile, the combination of a differential, rear driving shafts or live axles extending therefrom and driven thereby, means for taking power from said shafts, and disengageable means for connecting said shafts to the automobile wheels.

5. In a device for taking power from an automobile, the combination of a positively driven differential, rear driving shafts or live axles extending therefrom and driven thereby, means for taking power from said shafts, disengageable means for connecting said shafts to the automobile wheels, and means for locking either of said shafts from revolving.

6. In a device for taking power from an automobile, the combination of a differential, a driving shaft or live axle extending therefrom and driven thereby, a capstan or pulley arranged on the end of said shaft and having an extending clutch for engaging the automobile wheel arranged so that said shaft can be pulled outwardly to disengage said clutch from the automobile wheel without disengaging said shaft from the differential, and means for holding said shaft in its outer or inner positions.

7. In a device for taking power from an automobile, the combination of a rear axle casing, driving shafts or live axles extending therefrom, means for positively driving said shafts, wheels rotatably mounted with respect to said shafts, means rotatable positively with said shafts for transmitting power therefrom capable of being connected with the wheels to drive the wheels positively from the shafts and of being disconnected therefrom, and brake mechanisms for the wheels for holding the wheels stationary independently of the shafts.

8. In a device for taking power from an automobile, the combination of a power driven shaft, a wheel rotatably journaled with respect thereto, and means positively connected with said shaft for taking power therefrom, and for positively rotating said wheel.

9. In a device for taking power from an automobile, the combination of a power driven shaft, a wheel rotatably journaled with respect thereto, and means constantly connected with said shaft for taking power therefrom, said means being capable of being connected with, and disconnected from, the wheel, whereby the shaft can be caused to rotate said wheel or to operate said means without rotating said wheel.

In testimony whereof I have hereunto set my hand, in the presence of two subscribing witnesses.

RALPH L. MORGAN.

Witnesses:
  LOUIS W. SOUTHGATE,
  CATHARINE I. HARTNETT.